3,290,257
CURING LIQUID FOR HARDENING MONOMERIC POLYMERIZABLE ORGANIC COMPOUNDS

Erich Bäder and Hans Landsfeld, Hanau am Main, Germany, assignors to Deutsche Gold- und Silber-Scheideanstalt vormals Roessler, Frankfurt am Main, Germany
No Drawing. Filed Oct. 15, 1962, Ser. No. 230,668
Claims priority, application Germany, Oct. 19, 1961, D 37,261
9 Claims. (Cl. 252—426)

The present invention relates to improved curing liquids for hardening monomeric polymerizable organic compounds and more particularly to curing liquids which essentially consist of a solution of at least one alkyl substituted benzoyl peroxide in a liquid phlegmatizing agent.

It is known that monomeric polymerizable organic substances especially those containing a terminal $>C=CH_2$ group and which undergo vinyl polymerization, such as acrylic and methacrylic acid or their esters, styrene and the like, either alone or in admixture with each other, can be polymerized in bulk, solution, emulsion or dispersion, if desired, in the presence of polymers thereof or of unsaturated polyester resins, with the aid of polymerization catalysts. The catalysts employed in general are composed of the actual hardening component, usually a peroxide, and an accelerator therefor, such as cobalt salts, amines, organic sulfur compounds, heavy metal compounds and the like. Such accelerators are above all employed for bulk and solution polymerization with cold initiating catalyst systems. In carrying out such polymerizations the individual components of the catalyst system may be added individually to the polymerization mixture, usually without regard to sequence. After thorough admixture the polymerization then proceeds at room temperature without necessitating further measures. These systems, however, also are suited, with suited modification, if necessary, for suspension or emulsion polymerizations.

In measuring out and mixing in catalyst components it is very advantageous to employ such components in the liquid state not only for emulsion and dispersion polymerizations but also especially for bulk or solution polymerizations. This, especially, when small batches are concerned, facilitates measuring the dossages of the individual components, and even when larger batches are concerned and eventually with continuously operating metering arrangements, it is preferable that the components be admixed in the liquid state. As, in addition, dissolution of solids is not necessary, as in the case of pastes, the mixing in and distribution of the catalyst components is simplified. Liquid catalysts, for example, provide special advantages in the processing of cold curing reaction lacquers which are sprayed, cast or applied with salts as two components. Often some of the difficulties can be overcome, when a solid catalyst component is concerned, by first dissolving the catalyst and the accelerator in separate portions of the polymerization mixture and mixing such portions shortly before or directly during the processing. The solutions thus prepared, however, always have a limited life on storage.

Whereas the accelerator components for cold hardening polymerization systems usually are relatively easy to dissolve, this is not always possible to achieve under satisfactory conditions with the peroxidic curing agents. While a number of curing liquids are known, these always are hydroperoxides, ketone peroxides, alkyl peroxy esters or alkyl peroxides or respectively solutions of these in plasticizers, alcohols and the like. Such peroxy compounds are preferably used for hot curing but can also be used for cold curing in combination with cobalt catalysts. These initiator systems, however, usually are sensitive to coloring agents and fillers, temperatures and other polymerization conditions. As a rule, they may only be used in the polymerization of unsaturated polyester resins, as, for example, in the production of methyl methacrylate resins they do not or only very slowly initiate polymerization. Also, when less reactive polyester resins are concerned they only harden very slowly. In addition, these liquids and solutions as a rule must be handled with care as some cause skin irritations and the vapors thereof often are corrosive.

Diacyl peroxides are especially well known and very often used as peroxidic catalysts in view of their good properties in polymerization reactions. Examples of such diacyl peroxides, for instance, are benzoyl peroxide, lauroyl peroxide, dichlorobenzoyl peroxide and the like. These can be used in hot or cold curing. In cold curing, combinations of aromatic diacyl peroxides with tertiary amines as accelerator components are preferably used. These initiator systems are very insensitive to external influences, they cause very rapid and complete polymerization and furthermore yield cured products with good properties. The diacyl peroxides of all of the peroxides are the least objectionable physiologically.

Aromatic diacyl peroxides, however, are solids and also are employed in this form in polymerization. Preferably they are employed as an about 50% paste in plasticizers, such as dibutyl phthalate, in order to facilitate their processing. Although such hardener pastes have in general proved themselves rather good, they nevertheless have the disadvantage that their measuring out and mixture with the polymerization mixture not only requires a certain amount of time but also in many instances the distribution achieved is inadequate so that imperfections easily occur in the cured polymerized products.

Among the liquid diacyl peroxides only diacetyl peroxide (melting point 27° C.), also in plasticizers, has become known as a curing agent. However, diacetyl peroxide is a very decomposable substance and the solution thereof in plasticizers can only be stored with precautionary measures and only for a limited period of time. The polymerization initiating action of this substance furthermore is distinctly inferior to that of the aromatic diacyl peroxides and also in combination with tertiary amines is dependent upon the resin to be produced.

Acceptable hardening liquids of aromatic diacyl peroxides have previously not become known. While, of course, such peroxides can be dissolved in various solvents, the use of such resulting solutions meets with various difficulties. When solvents of good solvent capacity are employed the vapor pressures of the liquids are usually rather high. In many instances the decomposible or explodable nature of such solutions completely precludes their storage for long periods under normal conditions. Solutions of the peroxides in the monomers polymerize after a short period even upon cold storage. Other solvents, on the other hand, are not desirable in polymerization reactions as they have an inhibiting action. Still others have only such a low solvent capacity for the known aromatic diacyl peroxide catalysts that their use becomes questionable as too much non-polymerizable material is introduced when the curing agent is added to the mixture to be polymerized.

According to the invention it was found that the above indicated disadvantages could be avoided in the curing of monomeric polymerizable organic compounds, or their mixtures, preferably in admixture with a polymer of the monomeric compound and/or an unsaturated polyester resin, with the aid of aromatic diacyl peroxides when the curing agent is employed in the form of a liquid which in essence consists of a solution of one or more peroxides of alkyl substituted benzoic acids, preferably of di-o-toluyl peroxide and/or di-m-toluyl peroxide, in a phlegmatizing liquid. The aromatic diacyl peroxide containing curing composition according to the invention, in contrast to those previously known, are liquids which are distinguished by their high stability and, for example, can be stored for several months at temperatures between 14° C. and 30° C. They exhibit no tendency for premature decomposition or explosion and even after ignition burn off with a quiet flame. As the curing agents according to the invention are liquids, which in addition are colorless, they are extraordinarily easy to measure out and work into the polymerization mixture. The pot lives achieved approximate those obtained, for example, with the previously employed 50% pastes of benzoyl peroxide in dibutyl phthalate. Also, the mechanical properties, such as impact resistance, bending strength and Vickers hardness, which are obtained with the new curing liquids, are comparable to those previously attained and in addition the cured products produced with the curing liquids according to the invention are less discolored and contain fewer bubbles. This is of special significance in the production of reaction lacquers.

The curing liquids according to the invention are produced by dissolving the special diacyl peroxides in phlegmatizing liquids and in general solutions of up to 60% by weight in concentrations can be obtained. However, 20 to 50% by weight solutions preferably are employed.

The peroxides employed according to the invention can be produced by treatment of the corresponding alkyl substituted benzoyl halides, such as the o- or m-toluyl chloride with hydrogen peroxide and aqueous NaOH.

The phlegmatizing liquids usually are known under the designation "plasticizers." They include substances such as, for example, dibutyl phthalate, dioctyl phthalate, dioctyladipate, dioctyl sebacate and preferably dimethyl phthalate. Primarily concerned are the esters of aliphatic alcohols with polybasic aliphatic or aromatic carboxylic acids, the boiling points of which are over 140° C. Accordingly, the group of phlegmatizing agents does not include such substances as low boiling ethers, alcohols, esters, chlorinated hydrocarbons, benzene, toluene and other compounds known as "organic solvents." These, however, may be present as secondary components in the solutions according to the invention when special properties, for example, good spraying properties, are required for curing lacquers.

Di-m-toluyl peroxide exhibits especially good solubility in the above-mentioned phlegmatizing liquids and as a consequence such peroxide is preferably employed according to the invention.

The curing or hardening liquids according to the invention can be employed alone as polymerization catalysts, for example, with warming of the polymerizable mixture. Nevertheless, it is especially advantageous to use them in a so-called redox system. Very excellent results are obtained with such systems which, as reducing component, contain tertiary amines, preferably, those containing at least one aromatic radical bonded directly to the nitrogen atom. However, they can also be employed in conjunction with other known accelerators, such as organic sulfur compounds, cobalt salts, heavy metal compounds and the like. Among such sulfur compounds are mercaptans, preferably lauryl mercaptan and octyl mercaptan, the esters of mercapto acetic acid, such as glycol dimercapto acetate, isooctyl thioglycollate, α-amino sulfones, such as bis(tolylsulfonmethyl)-amine, bis(tolylsulfonmethyl)-benzyl amine and the like, α-hydroxy sulfones, sulfinic acids and their salts. These should be present in quantities such as, for example, are known for bulk polymerizations.

Often it is expedient also to employ heavy metal compounds in small quantities. Copper compounds, such as copper naphthenate, copper octoate, copper acetyl acetonate, copper acetate, general salts and complexes of copper, preferably, organic copper compounds soluble in the monomer, are employed as heavy metal compounds. They are employed in the usual small quantities, that is, in γ quantities.

Also, known additions of compounds, containing labile halogen atoms, iogenically bound halogen atoms often can be used with advantage in conjunction with the curing liquids according to the invention. All such compounds as are easily dissolved in the monomers can be employed. Preferably, hydrohalides, preferably hydrochlorides of tertiary amines, and/or halides, preferably chlorides of quaternary ammonium compounds, and/or ester halides, preferably ester chlorides, are employed.

The monomeric polymerizable organic compounds which can be hardened with the curing liquids according to the invention include all monomers which can be cured by vinyl polymerization. Examples thereof are styrene and the like, especially acrylic acid and methacrylic acid and their esters, especially lower alkyl esters, as well as solutions of unsaturated polyester resins in monomeric polymerizable organic compounds, especially styrene. The unsaturated polyester resins concerned herein are those derived from polycarboxylic acids, particularly, dicarboxylic acids, and polyhydric alcohols, particularly, dihydric alcohols, at least one of such carboxylic acid and alcohol components containing an ethylenic unsaturation. For example, such unsaturated polyesters can be prepared by condensing maleic acid, fumaric acid, itaconic acid, if desired in conjunction with other types of acids, such as phthalic acid, or their anhydrides with glycols, such as propylene glycol, ethylene glycol, diethylene glycol, and the like. Mixtures of various monomers can also be cured according to the invention. Expediently, polymers or copolymers or polymer mixtures of the monomers concerned are dissolved in the monomer or monomers to be polymerized in order to accelerate the progress of the curing.

The curing liquids according to the invention are especially adapted for curing syrupy monomer-polymer mixtures produced by partial polymerization of vinyl compounds and especially of methyl methacrylate in the presence of radical forming catalysts and sulfur containing regulators according to the procedure of German published application 1,083,057.

While the present disclosure primarily is with reference to the use of the curing liquids accordings to the invention in bulk or solution polymerizations, it is, analogously, also possible to use such curing liquids instead of other organic peroxides in suspension polymerizations. These curing liquids, furthermore, can be converted easily to aqueous emulsions with suited emulsifying agents and therefore can also be used in emulsion polymerizations and can also be added after preparation of the monomer or monomer-polymer emulsion.

The following examples will serve to illustrate the invention.

*Example 1*

M-toluic acid was converted in the known manner to the corresponding acid chloride. 1790 g. of the acid chloride were dissolved in 3 liters of petroleum ether and introduced into a 3 necked flask. The solution was cooled to a temperature of −5° to 0° C. and 650 cc. of cold 35% $H_2O_2$ added thereto while stirring. Then 750 g. of NaOH in 1.8 liters of water were added dropwise at a sufficiently slow rate that the temperature did not rise above +2° C. The mixture was then stirred for a further half hour and the peroxide which precipitated out filtered off. It was washed several times with cold water and then taken up in chloroform and such solution dried over sodium sulfate. The petroleum ether layer was washed with cold water in a separatory funnel and also dried over sodium sulfate. The peroxide was recovered from the solutions by crystallization or by evaporating off the solvents. The yield of di-m-toluyl peroxide was about 60% of the theoretical. Di-o-toluyl peroxide was prepared in an analogous manner from o-toluic acid.

Example 2

0.3 g. of diisopropylol-p-toluidine (amine employed as reducing component) were added to 100 g. of a prepolymer of methyl methacrylate prepared by partial polymerization of methyl methacrylate. Solutions of di-o-toluyl peroxide and respectively of di-m-toluyl peroxide were added to the thus prepared prepolymer and the progress of the polymerization as well as the character of the polymerization product compared with an analogous polymerization mixture which was prepared with a normal benzoyl peroxide paste instead of the toluyl peroxide solutions. The results are given in the following tables.

ROOM TEMPERATURE, 21° C.

|  | Di-o-toluyl peroxide as— | | 50% benzoyl-peroxide paste in dibutyl-phthalate |
|---|---|---|---|
|  | 35% solution in dimethyl-phthalate | 31% solution in dibutyl-phthalate |  |
| Percent by wt. solution or paste | 3 | 3 | 3 |
| Curing time, min | 21 | 21 | 21 |
| Temperature peak, ° C | 104 | 104 | 126 |
| Color of end product | (¹) | (¹) | (²) |
| Vickers hardness | 18.3 | 18.3 | 19.6 |
| Impact resistance, kg./cm | 8.0 | 7.5 | 6.3 |
| Bending strength, kg./cm.² | 1,253 | 1,213 | 1,120 |

ROOM TEMPERATURE, 19° C.

|  | Di-o-toluyl peroxide as— | | 50% benzoyl-peroxide paste in dibutyl-phthalate |
|---|---|---|---|
|  | 40% solution in dimethyl-phthalate | 31% solution in dibutyl-phthalate |  |
| Percent by wt. solution or paste | 3 | 3 | 3 |
| Curing time, min | 19 | 19 | 18 |
| Temperature peak, ° C | 121 | 130 | 123 |
| Vickers hardness | 18.3 | 18.2 | 19.3 |
| Impact resistance, kg./cm | 6.5 | 6.6 | 6.7 |
| Bending strength, kg./cm.² | 1,123 | 1,115 | 1,170 |

¹ Almost colorless.
² Light yellow.

Example 3

25 g. di-m-toluylperoxide, 70 g. dibutylphthalate and 5 g. xylene were stirred until a stable, clear curing liquid resulted. 2 g. of this liquid were added to a mixture consisting of 66 g. of an unsaturated polyester, 30 g. styrene, 0.1 g. paraffin and 2 g. of a 10% solution of di-isopropyl-ol-p-toluidine in styrene. This mixture was applied by spraying to a wooden surface. The thus formed lacquer was nailhard after 20 min.

The organic solvents can be present in the curing liquid in quantities of less than 15% weight, preferably about 5% weight or less.

We claim:

1. A curing liquid for hardening monomeric polymerizable ethylenically unsaturated organic compounds essentially consisting of a solution of about 20 to 60% by weight of at least one methyl substituted benzoyl peroxide in a liquid plasticizer having a boiling point over 140° C., said liquid plasticizer being an ester of an aliphatic alcohol with a polybasic carboxylic acid.

2. The curing liquid of claim 1 in which said peroxide is di-m-toluyl peroxide.

3. The curing liquid of claim 1 in which said peroxide is di-o-toluyl peroxide.

4. The curing liquid of claim 1 in which said liquid plasticizer is a di-ester of an alkanol with a dibasic carboxylic acid.

5. The curing liquid of claim 1 in which said liquid plasticizer is dibutyl phthalate.

6. The curing liquid of claim 1 in which said liquid plasticizer is dimethyl phthalate.

7. The curing liquid of claim 1 in which said liquid plasticizer is admixed with a minor amount of a low boiling inert organic solvent.

8. The curing liquid of claim 7 in which said organic solvent is present in quantity of less than 15% by weight.

9. The curing liquid of claim 7 in which the organic solvent is present in a quantity of about 5% by weight.

References Cited by the Examiner

UNITED STATES PATENTS

| 2,531,134 | 11/1950 | Kropa et al. | 252—426 |
| 2,554,567 | 5/1951 | Gerhart et al. | 252—426 |
| 2,858,280 | 10/1958 | Maltha | 252—426 |
| 2,910,443 | 10/1959 | Bader | 252—426 |

FOREIGN PATENTS

| 893,085 | 1/1944 | France. |
| 1,048,028 | 12/1958 | Germany. |

OTHER REFERENCES

Saha et al.: "Jour. Chem. Soc.," London, 1956, pp. 427–36.

Swain et al.: "Jour. Amer. Chem. Soc.," 72, 5426, pp. 5429 to 5434, December 1950.

Fenn et al.: German application Ser. No. D 17,076, printed July 12, 1956 (Kl. 39b, Gr. 22/10).

TOBIAS E. LEVOW, *Primary Examiner.*

SAMUEL H. BLECH, *Examiner.*

P. D. FREEDMAN, R. D. EDMONDS, J. G. LEVITT,
*Assistant Examiners.*